July 26, 1966  L. BELOVE  3,262,819
SEALED ALKALINE BATTERY CELLS WITH EXCESS GAS PRESSURE RELEASE
Filed June 9, 1965  2 Sheets-Sheet 2
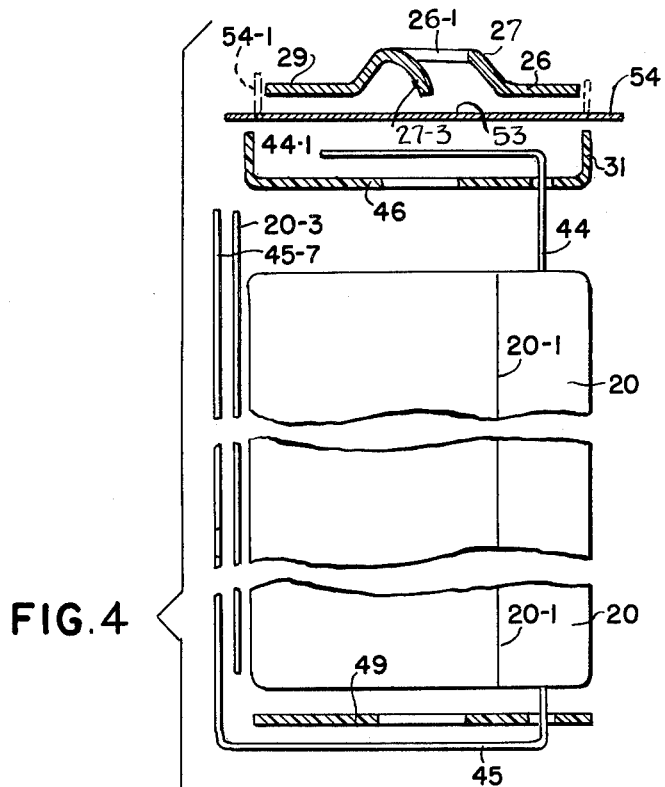
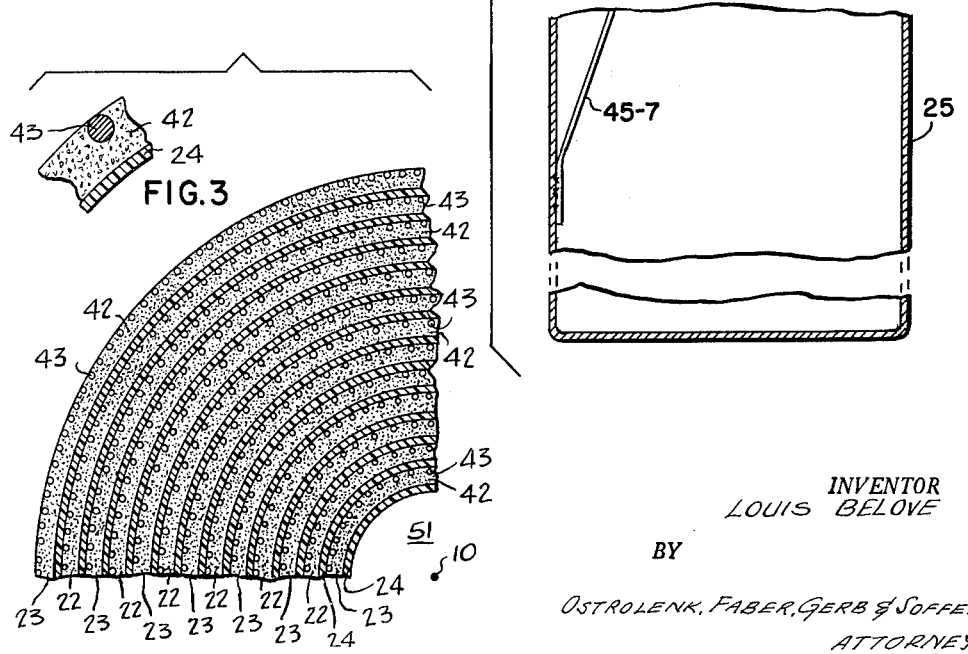
INVENTOR
LOUIS BELOVE
BY
OSTROLENK, FABER, GERB & SOFFEN
ATTORNEYS

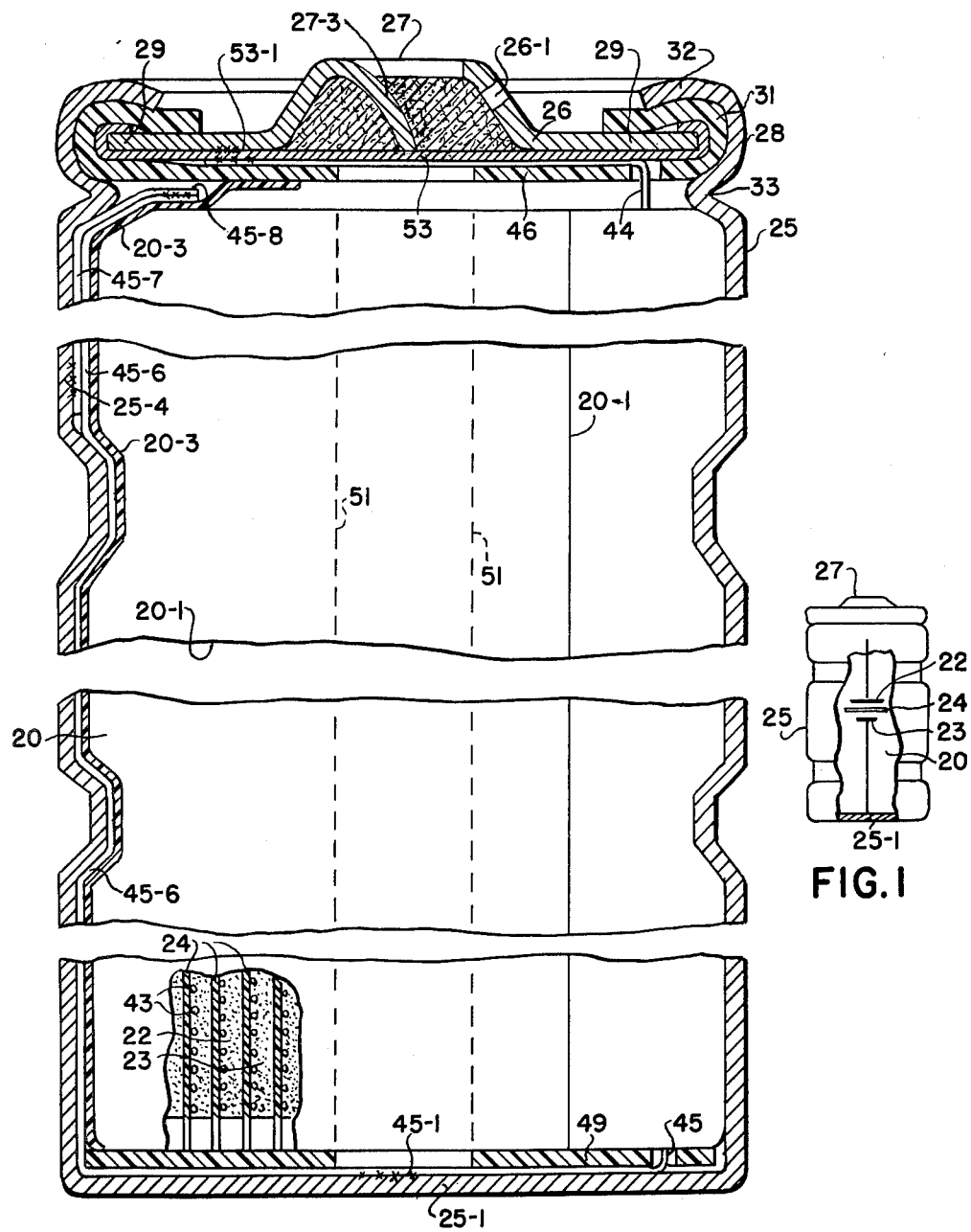

United States Patent Office 3,262,819
Patented July 26, 1966

---

3,262,819
SEALED ALKALINE BATTERY CELLS WITH EXCESS GAS PRESSURE RELEASE
Louis Belove, Ardsley, N.Y., assignor to Sonotone Corporation, Elmsford, N.Y., a corporation of New York
Filed June 9, 1965, Ser. No. 467,810
2 Claims. (Cl. 136—178)

This application is a continuation-in-part of my application Serial No. 109,196, filed May 10, 1961, now abandoned.

This invention relates to rechargeable electric battery cells, and particularly to hermetically sealed battery cells operating with an alkaline electrolyte, although some aspects of the invention are of broader scope.

The electrode assembly of such sealed cells comprises at least two superposed, opposite-polarity, adjacent sintered electrode plates the pores of which are loaded with active electrode substance, and electrolyte held immobilized or absorbed in pores of the electrode plates and in the pores of the non-conducting or insulating separator layer interposed between the electrode plates. In most cases, such sealed cells may be recharged without developing excessive internal gas pressure, provided the recharging current remains below a limited level. However, occasionally, on recharging a sealed rechargeable alkaline cell, there is developed an excessively high internal pressure which in some cases causes bursting of the cell casing.

Among the objects of the present invention is a hermetically enclosed, rechargeable alkaline cell having one casing enclosure wall formed of an integral, gas-tight metallic sheet with an outwardly deformable sheet section which is sufficiently thin to cause it to be broken open at a predetermined, limited raised internal gas pressure level.

Among the objects of the invention is also a sealed rechargeable cell with a hermetic casing enclosure having a relatively thick metallic end-wall rim held insulatingly and hermetically clamped between overlapping end-wall regions of the casing opening of a surrounding tubular casing, with a thin, metallic gas-barrier sheet extending over and hermetically sealing the casing opening and a sheet periphery overlapping the wall-rim edge and held clamped between the overlapping casing end-wall regions.

The foregoing and other objects of the invention will be best understood from the following description of exemplifications thereof, reference being had to the accompanying drawings, wherein:

FIG. 1 is an elevational and partially diagrammatic view of one form of battery cell exemplifying the invention;

FIG. 2 is a vertical cross-sectional view of the battery cell of FIG. 1, with some parts exaggerated for the sake of clarity;

FIG. 3 is a transverse cross-sectional view on a greatly enlarged scale, with some exaggerations, of the electrode assembly of the battery cell of FIG. 2;

FIG. 4 is an exploded view, with some exaggerations, of the components of the battery cell of FIG. 2, before they are assembled.

An exemplification of the invention will now be described in connection with a tubular or cylindrical battery cell of the type suitable for use in conventional flashlights, wherein one or a column of several similar battery cells are held in superposed relation for supplying current to a flashlight bulb, or in generally analogous applications wherein one or an assembly of battery cells are used to supply electric power to a load circuit thereof. However, some aspects of the present invention are applicable to battery cells having cell casings of rectangular, oval or other shapes, as required in different applications thereof.

FIG. 1 shows in elevation and diagrammatically, and FIGS. 2 to 4 show structurally, one example of a battery cell representative of the phases of the invention disclosed herein. The battery cell of FIGS. 1 to 4 is shown as having one pair of superposed electrode plates 22, 23 of opposite polarity, held separated by a porous or microporous, electrically-insulating separator sheet 24 with electrolyte held immobilized or absorbed in the pores of separator 24 and the electrode plates 22, 23. The superposed, opposite-polarity electrodes 22, 23 are shown coiled or wound into a spirally-coiled electrode structure or assembly 20 (FIG. 2) held in the compartment space of a tubular cell casing 25 with the axis of the coiled electrode assembly generally parallel to the major or vertical axis of the metallic, tubular battery casing 25. The electrodes 22, 23 shown are sintered electrode plates, the pores of which are loaded with active positive and negative active electrode substance, in any known way, for instance as described in Koren et al. Patent 2,708,212, and in the article, "Nickel Cadmium Battery Plates," published December 6, 1948, in the Journal of the Electrochemical Society, pages 289–299, volume 94, No. 6. Alkaline batteries of this type operate with a corrosive alkaline electrolyte, such as a 20% to 35% (by weight) solution of potassium hydroxide in water.

The tubular cell casing 25 is made of metal, and although shown as cylindrical in shape, may have rectangular or other shapes. The tubular casing 25 has an integral bottom wall 25–1, and its top casing opening is enclosed by metallic top wall 26. The metallic top wall 26 may be flat, or as shown, it may have a raised, hollow terminal wall element 27 projecting beyond the inwardly-crimped rim 32 of the casing 25. The rim 29 of top wall 26 is shown hermetically joined to the surrounding casing junction wall 28 across an endless or loop-shaped insulating collar 31 of suitable insulating material, such as nylon or other synthetic resin, held tightly clamped between them. In its original form, the periphery of insulating collar 31 has an L-shaped cross-section (FIG. 4), and may be distinct and separate from or form the periphery of insulating separator collar 31 interposed between the top of the electrode assembly 20 and overlying, exposed metallic portions of the cell. The strong, open top casing junction wall 28 (FIG. 2) has spun therein an inward shoulder ridge 33 which underlies the top wall rim 29, and the overlapping insulating collar 31. The relatively strong casing rim 32 of tubular casing 25 is deformed and crimped inwardly to compress the insulating collar 31 against the edge of the top wall rim 29 and its adjoining opposite rim surfaces and produce a gas-tight electrically insulating seal between top wall rim 29 and the surrounding tubular casing junction 28.

The electrode assembly of such cell casing may be formed of any type of superposed, porous, properly-loaded sintered metal-powder plates which are separated by an electrolyte-holding porous separator sheet or layer of electrically insulating material such as filter paper. For instance, the electrode assembly may consist of a stack of sintered and loaded electrode plates of one polarity alternately superposed over electrolyte-holding separators and electrode plates of opposite polarity, in the manner shown, for instance, in U.S. Patents Nos. 2,379,374 and 2,527,888, or British Patent No. 214,799 of 1924. In the form of the battery of the invention shown in FIGS. 1 to 4, the electrode assembly is formed of two superposed electrode plates 22, 23 of opposite polarity and an interposed electrolyte-holding separator sheet 24, which are coiled into a spirally-coiled plate assembly containing at least one-half of one coil turn. By way of example, the specific battery cell shown has the size of a conventional "D" dry battery cell, and its electrode assembly contains such superimposed, opposite-polarity electrode plates 22, 23 coiled into five coil turns fitting tightly within the interior compartment space of the tubular casing 25, and the electrically-conductive outer surface of the outer coil turn of negative electrode plate 23 may make metallic contact with the surrounding inner metallic surface of tubular or cylindrical cell casing 25. In the battery cell shown, the coiled electrode plate 22 is loaded with positive electrode material and constitutes the cell anode, and the coiled opposite-polarity electrode plate 23 is loaded with negative electrode material and constitutes the cell cathode.

As shown in FIG. 2 and in the enlarged detailed view of FIG. 3, the metallic backing grid or foil 43 of each electrode plate 22, 23 is displaced from the central stratum to the exterior convex stratum of the sintered-particle loaded layer 42 of the respective electrode plates, for holding slightly compressed the loaded sintered-particle layer 42 and suppressing escape of any loosened sintered and active electrode particles thereof. In addition, the sintered-particle layer of both electrode plates 22, 23, particularly in the case of sintered layers of substantial thickness such as of the order of 0.020" and greater, the sintered-particle layer 42 extending along the concave surface of the metallic backing foil 43, is pre-cracked along parallel, adjacent crack lines extending transversely to the side edges of the spirally-coiled electrode plates to suppress irregular cracking of the sintered layers and assure uniform minimum spacing between the superposed spirally-coiled electrode plates of the electrode assembly 20. The just-described features of the electrode assembly constitute the subject-matter and are claimed in the co-pending application of L. Belove, Serial No. 860,609, now Patent No. 3,083,249, filed Dec. 18, 1959, as a continuation-in-part of his prior application Serial No. 843,402, filed Sep. 30, 1959, now abandoned, assigned to the same assignee.

Each of the coiled, sintered electrode plate strips 22, 23 has metallically affixed, as by welding to a transverse edge portion thereof directly to the metallic surface of its backing foil 43, a strip-shaped metallic terminal tab 44, 45, respectively, of flexible sheet metal, such as a soft nickel sheet which is inert to the corrosive alkaline electrolyte. As seen in the cross-sectional detail portion of the electrode assembly 20 shown in FIG. 2, the insulating separator sheets or layers 24 extend beyond the lower and upper transverse edges of the spirally-coiled electrode assembly 20 so as to form upward and downward insulating-layer protrusions projecting beyond the transverse side edges of the spirally-coiled electrode plate strips 22, 23.

As disclosed in U.S. Patent No. 2,379,374, it is desirable to hold the superposed, opposite-polarity plates of alkaline battery cells tightly compressed across the interposed electrolyte-holding porous insulating separator layer. To hold the spirally-coiled assembly of opposite-polarity electrodes plates 22, 23 so compressed against the interposed insulating separator 24, a retainer film strip 20–1 of strong, heat-resistant insulating material such as nylon or other suitable synthetic resin, is wound around the exterior surface of the tightly wound electrode assembly 20 so that it may be inserted with a tight fit into the interior space of the tubular metal casing 25, with the overlapping edges of the retainer film strip secured to each other, as by conventional heat-sealing or by cement, as seen at 20–1 in FIG. 4.

In the shown electrode assembly 20, the positive electrode tab 44 extends upwardly from the positive electrode plate 24, and the negative electrode tab 45 extends downwardly from the bottom edge of the negative electrode plate 23. Before positioning the coiled electrode assembly 20 within the tubular casing 25 of the cell through the open casing end 32, the upper positive electrode tab 44 is threaded through a relatively large slot of the overlying insulating sheet barrier of suitable synthetic resin material such as nylon, overlying the battery assembly 20. The negative electrode tab 45 of the electrode assembly 20 is similarly threaded through a similar slot in the underlying similar insulating separator sheet barrier 49. Extensions of the positive and negative electrode tabs 44, 45, respectively, extending beyond the slot opening of the insulating barrier sheets 46 and 49, respectively, are metallically affixed, as by electric spot-welding, to metallic portions of or connected to the top positive terminal wall 26 and to the metallic casing 25 which forms the bottom terminal wall of the cell.

The spirally, tightly wound electrode assembly 20 with its negative electrode tab 45 threaded through the slot of the bottom insulating sheet 49 is inserted through the open casing end 28, into the interior of the tubular casing 25, before the upper internal casing shoulder 33 is formed in the upper casing portion. Thereupon, the upwardly-projecting end of the positive electrode tab 44 is threaded through the slot of the upper insulating barrier sheet 46, whereupon an upwardly-projecting end portion of the positive electrode tab 44 is secured to a metallic terminal portion through which it is connected to the upper metallic top wall 26 or its terminal portion 27.

Sealed, alkaline cells of the type described above may, in most cases, be recharged without developing excessive gas pressure, provided the recharging current remains below a limited current level. However, in some cases, when recharging such sealed, rechargeable alkaline cells, an excessively high internal gas pressure is developed in the interior, which gas pressure is sufficient to cause uncontrolled or explosive bursting of the cell casing 25. As protection against uncontrolled bursting of the casing of a sealed, alkaline battery cell of the type described above, it has been proposed to form one wall of the gas-tight enclosure casing out of a diaphragm of plastic material, such as polyvinyl chloride, polyethylene, or the like, which is impervious to liquid alkaline electrolyte, but is permeable to and permits passage of hydrogen and to some extent also oxygen, which constitute the gases developed in the casing enclosure of the cell assembly upon recharging, and which prevents development of excessive internal pressure within the casing enclosure. Such plastic diaphragms of the cell casing enclosure, even if made of nylon, are also permeable to water vapor. However, for the full effectiveness of sealed alkaline battery cells of the type described above, it is desirable that the gas and vapor constituents of the relatively small volume of alkaline electrolyte with its water content held absorbed in the pores of the insulating separator layer 24 and the opposite-polarity electrode plates 23, 23 of the assembly, should not be lost from the sealed casing enclosure of the cell assembly 20. Even diaphragms of steel or stainless steel which are sufficiently thin to assure their controlled, bursting under controlled, predetermined limited internal pressure within the casing enclosure of such alkaline cells, are permeable to water vapor and hydrogen.

In accordance with the invention, a sealed, gas-tight enclosure for the electrode assembly held in the metallic cell casing, is formed by uniting with a gas-tight, hermetic seal to the metallic rim of the casing end wall, an enclosure sheet of rolled metal which has minimized porosity and prevents or suppresses escape of water vapor and hydrogen from the interior of the gas-tight cell enclosure. Such rolled metal sheet should have at least one intermediate deflectable sheet section which is sufficiently thin to assure that it is broken open or bursts under predetermined upper level of internal gas pressure, developed within the cell casing enclosure. As an example, good results are obtained with a thin, rolled metal enclosure sheet formed of a soft grade of nickel having an intermediate central section or being throughout of sufficiently small thickness of the order of at most about 0.10″, and sufficiently thin to cause such sheet to burst under a limited pressure, such as not exceeding 500 pounds per square inch (p.s.i.). In practice, good results are obtained with a controllably-bursting enclosure sheet of rolled nickel having a thickness of about 0.006″ to about 0.001″, depending on the maximum internal pressure at which such protective enclosure sheet should burst. With such rolled-metal gas-tight sheet enclosure for the metallic cell casing 25, only the rim 29 of the top wall 26 forms in conjunction with the underlying rolled-metal burstable enclosure sheet 53 the gas-type enclosure seal for the casing opening of cell casing 25. In such cell of the invention, the more central portions of the top casing wall 26 have formed therein one or more openings 26–1 or connections to the exterior space to permit gases and vapor to be released upon bursting of the rolled-metal enclosure sheet 53.

Difficulties have been encountered in assuring on a production basis, a gas-tight seal between the clamped insulating sealing layer 31 and the edge regions of the relatively thick top-wall rim 29, and of the underlying thin, burstable, rolled-metal enclosure sheet 53. According to the invention, these difficulties are overcome by providing such burstable, rolled-metal enclosure sheet 53 with a wide rim 54 extending materially beyond the edge of the top wall rim 29 and causing the inwardly turned rim 54 of the rolled-metal enclosure sheet 53 to be tightly clamped in overlapped relation over the edge and peripheral side surfaces of the top-wall rim 29 when the tubular casing rim 32 is crimped over the insulating collar 31 and holding the casing junction region 28 under sealing clamping pressure against the edge and adjacent top wall rim surfaces and between the casing rim 32 and the casing shoulder 33. Before the top wall rim 29 is placed within the insulating collar 31 of the cell-component assembly (FIG. 4), the wider, thin, gas-tight, rolled-metal enclosure sheet or foil 53 is placed with its wide rim 54 in aligned overlapping relation, shown, under the rim 29 of the top wall 26. The outwardly-projecting rim 54 of the thin, rolled-metal enclosure sheet 53 may first be given, by metal forming, an L-shaped cross-section, as indicated by upwardly-extending, dash-line rim portion 54–1 (FIG. 4), having such lateral dimension as to fit over the edge of top wall rim 29 and fit within the upwardly-extending rim of the interposed insulating sealing collar 31.

In sealingly affixing the top wall rim 29 and the overlapping rim 54 (or 54–1) of underlying, thin controllably-burstable, rolled-metal enclosure sheet 53 across the interposed insulating collar 31 to the surrounding portions of strong metal casing 28, the thin rolled-sheet rim 54 (or 54–1) is folded and tightly clamped with gas-tight pressure engagement over the edge of the rim surfaces adjoining the edge of the top wall rim 29 by the strong pressure forces applied thereto by the overlying casing junction region 28 and the compressed casing rim 32 and the internal casing shoulder 33, which constitute strong, overlapping clamping structures.

Before forming the gas-tight insulating casing junction between the top wall rim 26 with its overlapping thin, controllably-burstable underlying rolled-metal sheet 53 and the surrounding insulating collar 31 and casing a junction wall portion 28, the opposite-polarity terminal tabs 44, 45 of the electrode assembly are first metallically connected, as by electric spot-welding, to metallic portions which are connected to or form part of top wall 26 or its terminal wall 27 and the tubular casing 25 which form the opposite-polarity terminals of the cell. Referring to FIGS. 2 and 4, before placing the top wall 26 with its underlying, wider, burstable, rolled-metal thin enclosure sheet 53 within the side walls of insulating collar 31 (as seen in FIG. 4), the end region of an extension 44–1 of terminal tab 44 is secured, as by spot-welding, to a sheet portion 53–1 of thin, rolled-metal sheet 53 underlying and held in contact with an overlying sheet portion of top wall 26, so as to form a welded metallic joint between electrode tab-end 44–1 of terminal tab 44, and the adjacent sheet portions of thin, rolled-metal sheet 53 and the overlying, strong metal top wall 26, as indicated by the weld symbols 53–1 in FIG. 2.

When two superposed, opposite-polarity sintered electrode plates with an interposed porous insulating layer are spirally coiled into an electrode assembly, such as seen in cross-section in FIG. 3, the resulting electrode assembly 20 has a hollow interior space 51 extending axially lengthwise generally along the axis of the electrode assembly 20, as indicated by dash-line in FIG. 2. Before inserting the electrode assembly 20, into the interior of tubular casing 25, the negative electrode tab strip 45 is folded under the bottom side of the electrode assembly 20, and the insulating sheet 49 with its central sheet opening, so that the bottom terminal tab 45 shall overlap and be exposed through the bottom end of the interior hollow space 51 of the electrode assembly. To provide weld connection between the bottom negative electrode tap strip 45 and the underlying metal casing bottom wall 25–1, an elongated welding terminal rod is inserted through the interior hollow space 51 of the electrode assembly 20 to place it under pressure over the exposed underlying tab portion 45–1 aligned therewith, and produce with an underlying complementary welding electrode plate an electric metallic weld connection between the tab portion 45–1 and casing bottom wall 25–1. Although such welds, which might be called "blind" welds, may be checked for quality, by electric resistance and continuity tests, such blind weld connection may nevertheless be mechanically weak. It has been found that such blind tab-weld connections when so weak or weakened, may have relatively high electric resistance, so that the passage of charging current will develop excessive heat at the casing-weld junction of electrode tab 45–1 and ignite an explosive gas atmosphere such as hydrogen developed in the casing enclosure while the cell is recharged.

In accordance with a phase of the invention of U.S. Patent 3,021,367, the electrode tab extending from the region of the electrode assembly which is remote from the tubular casing opening is provided with a tab extension extending along the interior casing walls to near the casing opening, which may be reached for proper inspection of the weld connection and make it possible to weld an end tab of such remote electrode tab of the electrode assembly to an interior surface portion of the casing.

One example of such fully inspectable metallic electric weld connection, between a remote electrode tab of an electrode assembly and the interior surface of its metallic casing enclosure will now be described. Referring to FIGS. 2 and 4, the bottom negative electrode-tab 45 of the electrode assembly 20, which is folded over and passes below the central opening of the bottom insulating sheet 49 and the hollow interior space 51 of the electrode assembly, has a further tab extension 45–6 which passes along the interior casing surface 25–4 to near the casing opening of casing 25.

The problems connected with insertion of the coiled electrode assembly into its operative position within the interior of the tightly-fitting tubular metal casing 25, are greatly simplified, by first affixing by spot-welding at 25–4 to an interior casing surface portion, an auxiliary, elongated, flexible metal tab 45–7 extending outwardly into the space of the casing opening above the upper level of the electrode assembly. The upper end of the remote tab extension 45–6 overlaps the upper tab end of casing tab 45–7. The casing tab 45–7 of metal casing 25 is made sufficiently long as to make it possible to join, by a fully inspectable electric weld, the upper end of the remote tab extension 44–6 to the overlapping upper end 45–8 of the casing tab 45–7 of the metal casing while the two overlapping tab ends are exposed above the upper level of the electrode assembly 20 as it is held in its operative position within the interior of the casing 20, as seen in FIG. 2, while the casing 25 is still open.

In inserting the electrode assembly 20 into tubular casing 25 the electrode assembly slips smoothly past upwardly-projecting casing tab 45–1 into the innermost position in casing 25 with the casing tab 45–7 held in overlapping engagement with the remote tab extension 45–6 of electrode assembly 20, so that their overlapping upper tab ends are at the same level. To assure that pressure exerted by the tabs 45–6, 45–7 does not damage the film wrapper 20–1 of electrode assembly 20, an additional insulating film strip 20–3 slightly wider than the tab extension 45–6 is placed between it and the insulating wrapper 20–1.

After completing the welding junction between the overlapping upper ends of casing tab 45–7 and remote electrode tab extension 45–6, they are folded with the interposed insulating film strip 20–3 over the upper separator sheet extensions projecting above the upper side edges of the electrode plates 22, 23 of the electrode assembly 20 (FIG. 2). An additional spot-weld junction as indicated by the welding symbols (XX) may be formed between the bottom tab portion 45–1 underlying the hollow interior space 51 of the electrode assembly and the adjacent metallic bottom casing wall 25–1.

After completing the welding connection of the negative electrode tab 45–6 of the electrode assembly 20 to casing 25, the inner casing shoulder 33 is formed in the upper casing wall, as seen in FIG. 2. Thereafter, the positive upper electrode tab 44 is threaded through the wide slot of the upper insulating barrier sheet 46.

Thereafter, the tab-end 44–1 of the upper positive electrode tab 45 is welded to the interior surface of the thin rolled-metal sheet 53 and the overlying rim region of the top metal wall 26. Thereupon, the top wall 26 with the overlying metallic rim 54 of the thin rolled-metal sheet 53 is lowered between the side rim walls of the insulating collar 31 held within the open casing end 32 (FIG. 4). Thereupon, upwardly-extending, straight casing wall junction region 28 is subjected to a crimping operation, whereby it is crimped with the required force to compress and deform the original shape of the insulating collar 31 against the edge and the adjoining opposite rim surfaces of top wall rim 29 and the overlapping sheet rim portions 54 of the rolled thin metal sheet 53, and establish gas-tight sealing engagement between them through the forceful clamping action between the crimped-over casing rim 32 and the underlying inward casing shoulder 33.

This interior top wall space may be filled with a damping material, for instance a fibrous material such as glass wool, for damping and reducing the level of the sound caused by the outflow of gas through a burst opening of the thin rolled sheet wall 53 of the casing enclosure to the exterior space.

With a sealed cell of the invention of the type described above, excess internal pressure developed within the sealed casing enclosure while recharging the cell, will cause the thin rolled, gas-tight metal sheet 53 to brust open under predetermined selected upper pressure level. For example, with a hermetic casing enclosure of the electrode assembly having a thin, gas-tight, rolled-metal sheet 53 of soft nickel, with a thickness of the order of 0.001", and secured with a gas-tight insulating joint to the casing opening of metal casing 25, the sheet 53 will burst if excess pressure in the interior of the casing enclosure exceeds about 170 p.s.i. Where it is desired to cause such thin, gas-tight, rolled-metal sheet to burst open at a higher pressure, such as 300 p.s.i., the thickness of its central sheet section may be correspondingly increased to a selected thickness in the range up to 0.008".

In operation, when a sealed alkaline cell of the type described above is being recharged and develops during such recharge, a pressure in excess of 170 p.s.i., a thin, gas-tight, rolled-metal sheet enclosure 53 of such cell casing will burst open and release the gases if the thickness of such rolled-metal sheet is 0.001".

Metals other than nickel may be used for forming gas-tight casing enclosures with a burstable, thin, gas-tight, rolled-metal enclosure sheet of the casing enclosure. As an example, such controllably-bursting enclosure sheet 53 may be formed of thin sheets of steel which is coated with a tightly-adhering coating of nickel, as by an electroplating process, with the composite sheet rolled, if necessary, to give it the desired gas-tightness and the desired small thickness.

It is to be understood that a sealed battery cell of the invention having a high-density, gas-tight metal sheet enclosure diaphragm of the type described above, may carry as an integral part thereof a piercing projection facing the thin metal sheet portion which is deflected outwardly under increasing internal pressure, for causing such deflected thin-metal sheet portion to be pierced open at a predetermined range of increased internal gas pressure and releasing the gases to the exterior space. As an example, referring to the sealed cell of FIGS. 2 to 4, the metallic top wall 26 may have a downwardly-pointing piercing projection 27–3 for causing the pressure-deflected, thin-metal enclosure sheet 53 to be pierced and permit escape of enclosed gases at a predetermined level or level range of internal gas pressure. The piercing projection 27–3 may be secured in any suitable way to an overlying portion of the top wall 26. For instance, it may consist of a triangularly-shaped sheet projection the sides of which have been struck or cut from the raised terminal wall portion 27 of the top wall, and bent inwardly as shown, for example, in the process of shaping the top wall 26, or in a distinct operation.

The principles underlying the invention described in connection with specific exemplifications will suggest other modifications and applications thereof. It is accordingly desired that the appended claims shall not be limited to specific examples shown or described herein.

The embodiments of the invention in which an exclusive privilege or property is claimed are defined as follows:

1. In a sealed rechargeable battery cell:
    an electrode assembly of at least two opposite-polarity electrodes and associated electrolyte which develop gas pressure when charged,
    a sealed enclosure comprising a strong tubular metallic casing and a strong metallic cover sheet enclosing said assembly and connected to said two electrodes, respectively,
    said cover sheet having a peripheral cover rim affixed to the surrounding tubular casing junction region near the open casing end of said tubular casing,
    said cover sheet having a vent opening spaced from its rim and a strong tooth with a sharp end projecting toward the casing interior,
    a thin flexible metallic diaphragm underlying the entire interior surface of said cover sheet for flexure against and being punctured by said tooth by gas pressures within said enclosure,
    said diaphragm having a rim surrounding and overlapping a substantial exterior radial rim area of said cover rim,
    a continuous plastic insulating collar surrounding said cover rim and having inner and outer collar flanges overlapping substantial interior and exterior radial rim areas of said cover rim,
    said tubular casing junction region having a doublewall inward casing projection underlying the interior rim area of said cover rim with its said overlapping diaphragm and collar flanges, the open end section of said tubular casing junction region being inwardly turned and holding clamped said plastic collar with compression forces toward the edge of said cover rim and with axial compression forces toward said inward casing projection and confining therewith said inner and outer collar flanges and the embraced coversheet and diaphragm rim under gas-tight compression sealing engagement, said diaphragm having sufficient strength to resist excessive deformation under normal internal gas pressure and being deformed into puncture engagement with said cover tooth under predetermined raised internal gas pressure.

2. In a sealed rechargeable battery as claimed in claim 1, said metallic diaphragm having a thickness of at most 0.008 inch.

No references cited.

WINSTON A. DOUGLAS, *Primary Examiner.*

D. L. WALTON, *Assistant Examiner.*